D. PROUTY.
Plow.
No. 4,928. Patented Jan. 13, 1847.
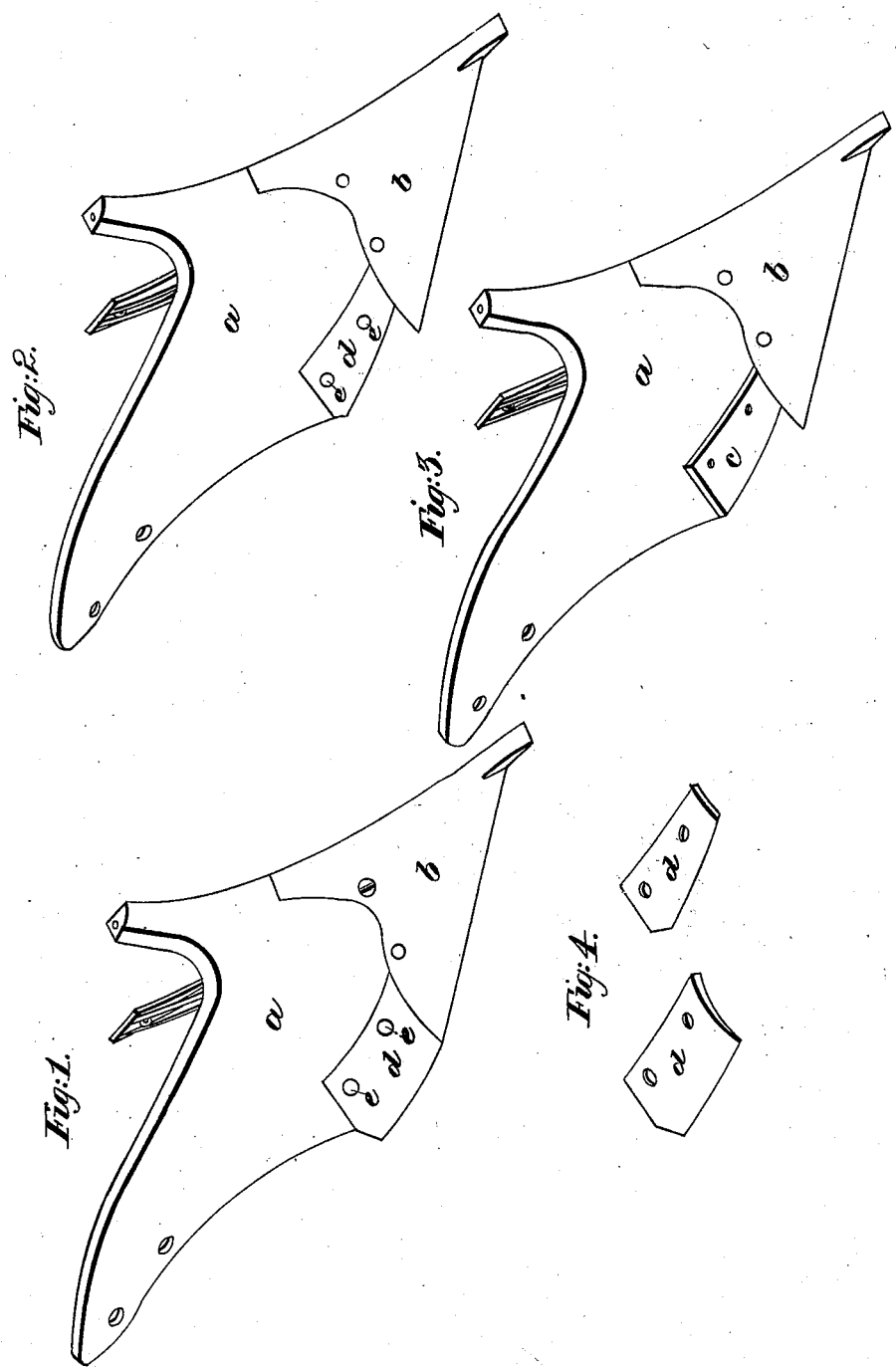

UNITED STATES PATENT OFFICE.

LORENZO PROUTY, OF DORCHESTER, MASSACHUSETTS, EXECUTOR OF DAVID PROUTY, DECEASED.

IMPROVEMENT IN PLOWS.

Specification forming part of Letters Patent No. 4,928, dated January 13, 1847.

*To all whom it may concern:*

Be it known that DAVID PROUTY, of Dorchester, in the county of Norfolk and State of Massachusetts, trader, deceased, to whose will the undersigned, LORENZO PROUTY, of said Dorchester, is executor, invented in his lifetime a new and useful Improvement in Plows; and I do hereby declare that the following is a full, clear, and exact description of the principle or character which distinguishes the said invention of said DAVID PROUTY from all other things before known, and of the manner of making, constructing, and using the same, reference being had to the accompanying drawings, making part of this specification, in which—

Figure 1 is a representation of the mold-board and share of a plow with the said improvement of said DAVID PROUTY applied to adapt the plow to the cutting of a wide furrow; Fig. 2, a representation of the same modified for a narrow furrow; Fig. 3, a view of the same without the improved part, but representing the excavation in the mold-board for its reception; and Fig. 4, separate views of the improved parts of Figs. 1 and 2.

The same letters indicate like parts in all the figures.

It is necessary, in the mode heretofore practiced of constructing plows, to have different-sized plows or shares for different widths of furrows, each plow or share cutting but one width of furrow, which is a source of much inconvenience to the farmer. The object of the said improvement of said DAVID PROUTY is to avoid this inconvenience by adapting one plow to various widths of furrows by making a recess in that part of the wing of the mold-board next to the rear end of the share, into which pieces of different widths can be fitted. In this way any desired width of furrow can be cut with the same plow and share, not, however, less than the width of the share.

In the accompanying drawings, *a* represents the mold-board, which can be of any form desired, and *b* the share, fitted thereto in the usual way. The wing of the mold-board, or that part of it which lies just back of the rear end of the share, is cast or otherwise formed with a recess, as represented at *c* in Fig. 3, and to this recess is fitted and secured by screw-bolts *e e* a piece, *d*, of any required width, which may be removed at pleasure and another of greater or less width substituted, as shown in Figs. 1 and 2, the upper surface of this movable piece (which may be denominated an "adjusting-wing") being properly adapted to the surface of the mold-board and share, so as not to rise above them. The forward end of this adjustable wing is fitted to the rear end of the share, and has the appearance, when put on, of being a continuation of it.

From the foregoing it will be evident that each plow can be accompanied with any desired number of these adjustable wings and of different sizes, so that by removing the screw-bolts *e e* they can be changed and the plow adapted to the cutting of a wide or narrow furrow at pleasure.

It is not intended by this specification to limit the invention to any particular mode of fastening or to any particular kind of metal, although the inventor preferred, and the said LORENZO PROUTY, his executor, prefers, using screw-bolts with countersunk heads as the means of fastening, and cast-iron as the metal best adapted to the forming and fitting of the parts, as well as to their durability.

What is claimed as the invention of said DAVID PROUTY, and is sought to be secured by Letters Patent, is—

The adjustable and shifting wing or wings, in combination with the mold-board, as described, by means of which the same plow can be adjusted to the cutting of furrows of different widths, as set forth above.

LORENZO PROUTY, *Executor.*

Witnesses:
GEO. KIMBALL,
ISAAC M. IRELAND.